United States Patent [19]

Wagner

[11] 4,247,124
[45] Jan. 27, 1981

[54] CHUCK

[75] Inventor: Rudolf Wagner, Stuttgart, Fed. Rep. of Germany

[73] Assignee: Rems-Werk Christian Föll und Söhne GmbH & Co., Waiblingen, Fed. Rep. of Germany

[21] Appl. No.: 938,833

[22] Filed: Sep. 1, 1978

[30] Foreign Application Priority Data

Sep. 3, 1977 [DE] Fed. Rep. of Germany ....... 2739757

[51] Int. Cl.³ .............................................. B23B 31/18
[52] U.S. Cl. ................................... 279/106; 279/1 H; 279/33
[58] Field of Search ................ 279/1 C, 1 SG, 33, 34, 279/1 ME, 1 H, 106

[56] References Cited

U.S. PATENT DOCUMENTS

| 2,006,621 | 7/1935 | Berg | 279/1 H |
| 2,224,633 | 12/1940 | Highberg et al. | 279/1 H |
| 2,776,842 | 1/1957 | Marsden | 279/33 |
| 2,890,888 | 6/1959 | Damijonaitis | 279/33 X |
| 2,916,290 | 12/1959 | Skillin | 279/106 |
| 3,232,629 | 2/1966 | Obear | 279/106 |
| 3,561,304 | 2/1971 | Bachmann | 279/106 X |
| 3,575,434 | 4/1971 | Kiwalle | 279/1 H |

Primary Examiner—William R. Briggs
Attorney, Agent, or Firm—Becker & Becker

[57] ABSTRACT

A chuck, especially for a device for machining pipes and the like as for instance for threading, deburring, cutting and similar operations, with chucking jaws pivotable about an axis substantially parallel to the axis of the chuck for chucking the workpiece to be machined. The chuck is mounted on a rotatable support, and the chucking jaws are positively connected to the driving motor so that the chucking jaws automatically move into their chucking position in response to the start of the motor.

6 Claims, 4 Drawing Figures

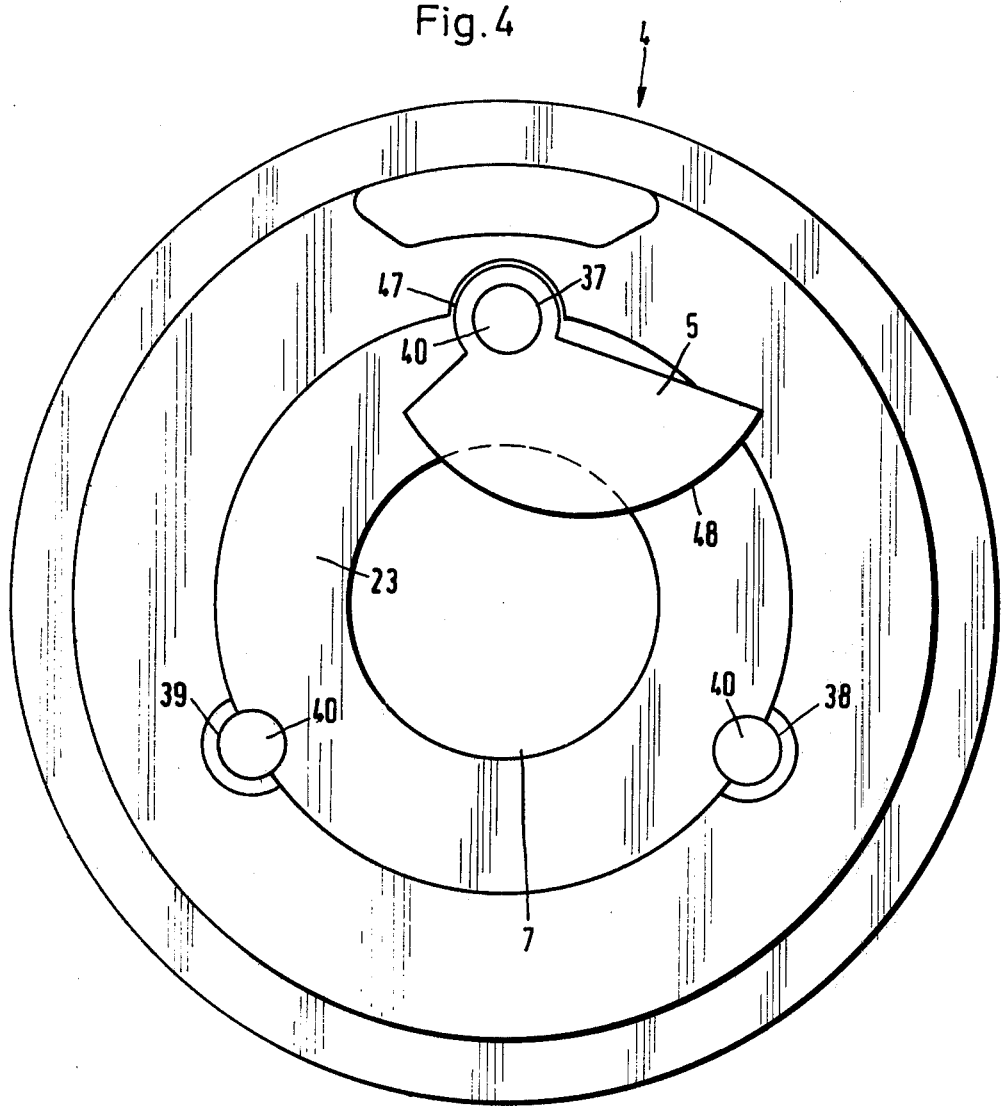

CHUCK

The present invention relates to a chuck for a device for machining pipes or the like such as threading, deburring, cutting and the like. More specifically, the present invention relates to a chuck of the above mentioned type which is provided with chucking jaws respectively pivotable about an axis substantially parallel to the axis of the chuck, for chucking the workpiece to be machined, said chuck being mounted on a rotatable support and being operable by a driving motor.

With a heretofore known device of the above mentioned type, the chucking jaws are respectively provided with a groove-shaped recess engaged by a pin on a control disc which is connected to a brake disc. A brake band is passed over said brake disc and is adapted to brake the control disc. When the driving motor for chucking the workpiece is turned on, the control disc braked by the brake band first does not rotate so that the chucking jaws are by means of the pins of said control disc pivoted toward the workpiece until they engage the circumference thereof. Thereupon, the control disc is rotated against the force of the brake band.

Such a design of the chuck requires relatively many structural elements. The chucking jaws in such device are actuated indirectly so that only comparatively low chucking forces can be exerted upon the workpiece. Moreover, the device consists of relatively many elements and therefore is structurally expensive. In addition thereto, the device has to be serviced because an element is employed namely the band brake which wears, and after a longer period of use is no longer able in view of the wear to exert its braking effect or at least not to the desired extent. When this occurs, problems are encountered when chucking the workpiece.

It is, therefore an object of the present invention to provide a chuck which will overcome the above mentioned drawbacks, will require practically no servicing and will be composed of few parts.

These and other objects and advantages of the invention will appear more clearly from the following specification in connection with the accompanying drawings, in which:

FIG. 1 diagrammatically illustrates a device according to the invention with a machining device.

Figure 2:
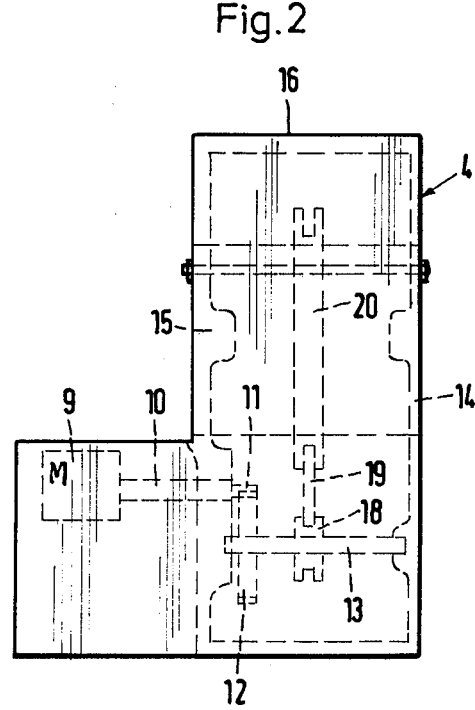
FIG. 2 is a diagrammatical view of the chuck in which the chucking jaws and the chucking jaw shafts are not illustrated.

FIG. 4 diagrammatically shows a front view of the chuck according to FIG. 2., but on a larger scale than the latter.

The chuck according to the present invention is characterized primarily in that the chucking jaws are automatically connected to the drive motor. Due to the automatic connection of the chucking jaws with the drive motor, the chucking jaws will in response to the turning on of the driving motor be pivoted immediately toward the workpiece until they engage the latter. As a result thereof, no band brake is necessary as is the case with the heretofore known devices so that the device according to the invention has no elements subjected to wear. As a result thereof, the device according to the invention can be produced very economically and for practical purposes does not need any servicing. In view of the elimination of wearing parts, fewer structural elements are necessary than are required with heretofore known devices of the general type involved.

The chuck according to the invention can advantageously be employed together with a device for machining pipes, bars and the like, for instance for threading and/or deburring and/or cutting.

Referring now to the drawings in detail, the machining device has a threading die head 1 which comprises about radially advanceable cutting jaws not illustrated. The threading die head 1 is displaceable on guiding means 2 such as guiding bars and is adapted to be arrested. The guiding means 2 is mounted in the housing of a chuck 4 and supported thereby. The chuck (FIG. 4) which comprises radially advanceable chucking jaws 5 is located opposite the threading die head 1. The workpiece 8 to be machined is guided by a central opening 6 and 7 in the threading die head 1 and in the chuck 4 respectively.

Figure 1:
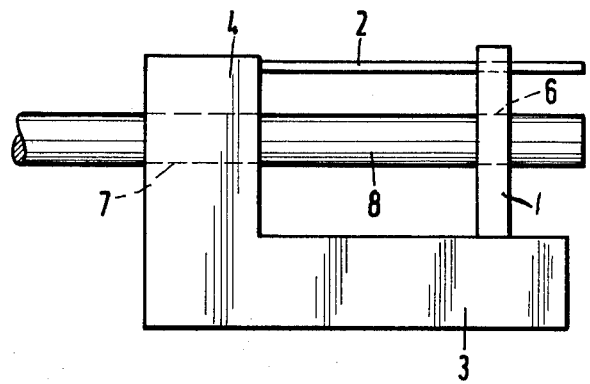

The chuck 4 according to FIG. 1 forms one single piece with the machine bed 3. Of course, if desired, the chuck may also be a separate structural element which is displaceable along guiding means. Instead of the machine bed 3, any other suitable support for the chuck 4 and/or the threaded die head 1 may be provided. Instead of the head 1 or in addition thereto, a deburring tool, a cutting tool or the like may be provided.

The chuck 4 has associated therewith a driving motor 9 (FIG. 2), the driving shaft 10 of which is provided with a pinion 11. Pinion 11 meshes with a gear 12 provided on an intermediate shaft 13 while both ends of said shaft 13 are rotatably journalled in walls 14 and 15 of the housing 16. The pinion 11 is likewise rotatably supported in the housing wall 15 by at least one bearing 17. A sprocket wheel 18 is mounted on the intermediate shaft 13 at about half the length thereof, said intermediate shaft being located at a level lower than the driving shaft 10. The sprocket wheel 18 is by means of a chain 19 drivingly connected to a sprocket wheel 20 serving as driving wheel. One lateral surface of the driving wheel engages a side wall 21 of a depression 22 which latter is provided on the outside of a drum-shaped support 23 and extends over the entire circumference thereof. The driving wheel 20 has its other lateral surface in engagement with an annular flange 24 which forms one piece with the side wall 14 of the housing 16 (FIG. 2). In this way, the drive wheel 20 is secured in axial direction without the necessity of providing separate safety elements therefor.

The drum-shaped support 23 comprises an opening 7 for passing the workpiece 18 therethrough and is within the region of that end thereof which is located in the housing wall rotatably supported on the inner wall of the annular flange 24 by means of a sliding bearing 25. At its other end, support 23 is by means of another slide bearing 26 rotatably supported in spaced relationship to the housing side wall 15 by the inner wall of housing mantle 27 and by the oppositely located wall of a semi-circular flange-shaped supporting member 28 forming one piece with said side wall 15. Within the region of slide bearing 25, the support 23 has a smaller diameter than said drive wheel 20.

That side of drive wheel 20 which faces away from housing wall 14 has a protruding annular flange 29 which rests on an axially located shoulder surface 30 of a step 31 of support 23. As a result thereof, the driving wheel 20 is safely journalled in radial direction.

The sliding bearing 26 arranged within the region of the housing side wall 15 engages the outer surface of an end member 32 of support 23 which end member 32 has an increased diameter. The outer diameter of the end member 32 substantially corresponds to the outer diameter of the driving wheel 20. The end portion 32 has a radially projecting circular rim 33 which axially secures the slide bearing 26 on that side which faces away from the sprocket wheel 20. Said rim 33 engages the inner wall of the supporting member 28. The support 23 is by means of a safety ring 34 secured in axial direction. The safety ring 34 engages a depression on the inner side of a supporting member 28 and of the housing mantle 27 and engages the rim 33 of the support on that side which faces away from the slide bearing 26. Between the supporting member 28 and the housing mantle 27 and the supporting rim 33 there is provided an annular seal 35. Similarly, between the other slide bearing 25 and the support 23 there is provided an additional annular seal 36.

Three passage openings 37-39 for chucking jaw shafts 40 (FIG. 4), are provided in the drum-shaped support 23 while being uniformly distributed over the circumference thereof. The ends of said chucking body shafts 40 project beyond the lateral walls 14 and 15 of the housing (FIG. 3), and by means of safety rings 41 engaging the lateral walls, are secured against accidental axial displacement. Each end of each chucking jaw shaft 40 has by means of a clamping bolt 42 nonrotatably mounted thereon a chucking jaw 5. Each chucking jaw 5 engages the pertaining end face 43, 44 of the support 23.

Each of the two end faces 43, 44 of the support 23 is provided with a groove 45 which surrounds the chucking jaw shafts 40 and serves for receiving an annular seal 46.

The chucking jaws 5 are respectively connected to the pertaining shaft 40 by means of an extension 47 having an about semi-circular contour (FIG. 4). The chucking surface 48 of the chucking jaws 5 are eccentrically curved to such an extent that the chucking jaws can safely chuck workpieces of different outer diameters.

About at half length on each chucking jaw shaft, a gear 50 is connected thereto by means of a clamping bolt 49 which gear meshes with the inner teeth 51 of the driving wheel 20 in the manner of a planetary gear transmission. The gears 50 are in a protective manner located completely within the recesses 22 on the outside of the drum-shaped support 23. The axial length of the gears 50 is slightly less than the corresponding length of the depressions 22 so that the gears 50 can be turned properly.

When it is intended to chuck a workpiece in the chuck 4, the drive motor 9 is turned on. The drive shaft 10 will then through the gear transmission 11, 12 drive the intermediate shaft 13. As a result thereof, also the drive wheel 20 is rotated through the intervention of the sprocket wheel 18 and chain 19. The gears 50 engaging the inner teeth 51 of the drive wheel 20 will consequently likewise be rotated while the shafts 40 are rotated about their axes. The direction of rotation of the chucking jaw shaft 40 is so selected that the chucking jaws 50 are pivoted in the direction toward the workpiece 8. The chucking jaws 5 are thus through the intervention of the described transmission, automatically connected to the drive motor 9 so that immediately in response to the turning on of the motor, the chucking jaws 5 are pivoted in the direction toward the workpiece 8. When the chucking jaws engage the workpiece, the rotary movement of shafts 40 and gears 50 stops. Then the entire drum-shaped support 33 is rotated about its axis 52 whereby the chucked workpiece 8 to be machined is likewise turned about its axis. In view of the self-locking property of the transmission connection 50,51, the workpiece 8 is safely chucked, and the chucking jaws 5 cannot move away from the workpiece. Inasmuch as the chucking jaws 5 are driven directly through the intervention of the transmission by the drive motor, also a high chucking force can be produced so that a slipping of the workpiece cannot occur. As a result thereof, for instance threads properly can be cut on the workpiece. The chucking device 4 comprises only a few structural elements and therefore can be very economically produced. In particular, no wearing parts are necessary such as band brakes, so that the lifespan of the device according to the invention is rather long. In view of the absence of parts subjected to wear, the chuck according to the invention does, for all practical purposes, not require any servicing.

Figure 3:
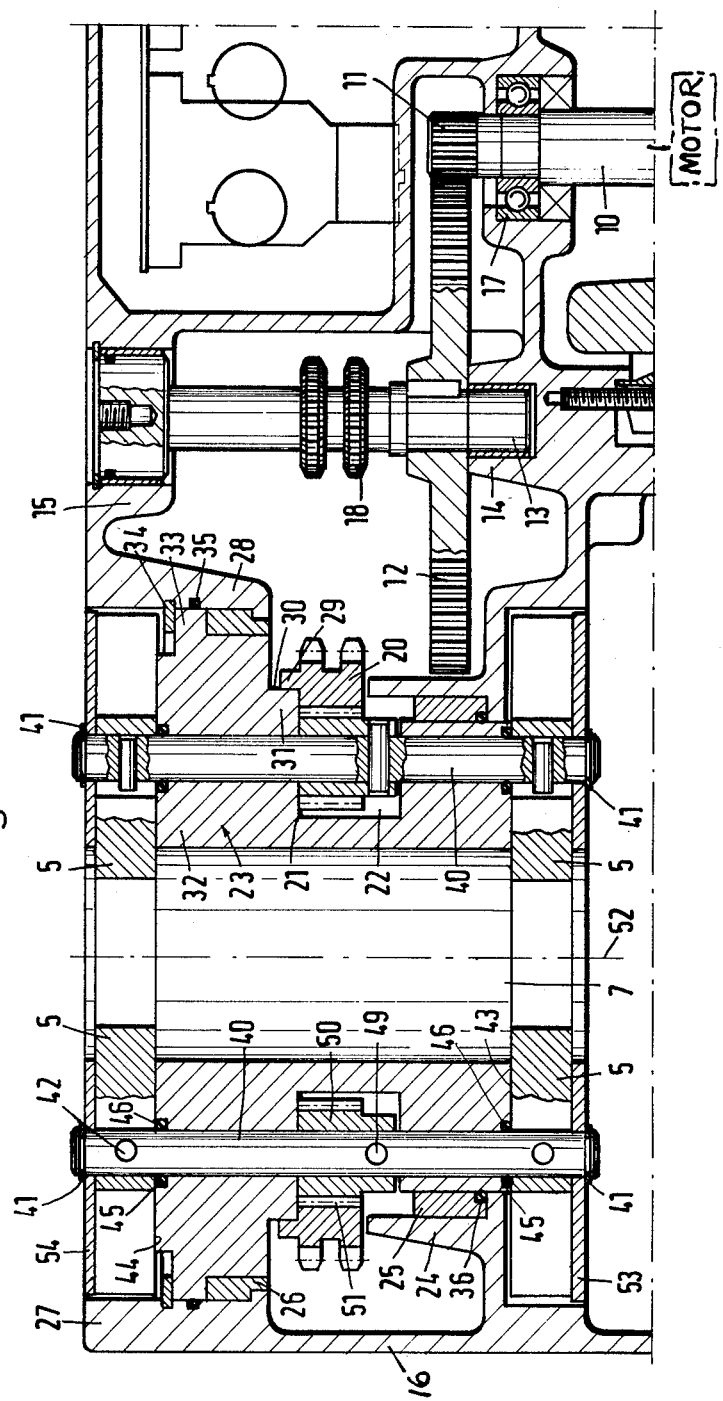
FIG. 3 represents a section through the chuck according to FIG. 2, but on a larger scale than that of FIG. 2.

For purposes of withdrawing the workpiece from the chuck, it is merely necessary to reverse the direction of rotation of the drive motor 9. In view of the automatic driving connection, the chucking jaws 5 instantaneously release the workpiece. Expediently, within the region of the drum-shaped support 23, the side wall 14, 15 of the housing is formed by a detachable cover 53, 54. As shown in FIG. 3, after removal of the safety rings 41 from the chucking jaw shafts 40, and after removal of the cover 54, the support 23 together with the driving wheel 20 and the gears 50 can easily be moved out of the housing 16. The diameter measured between the supporting member 28 and the housing mantle 27 is greater than the outer diameter of the sprocket wheel 20 so that the support 23 easily can be moved out together with the sprocket wheel 20.

Instead of the chain drive 18, 19, the driving wheel 20 may also have outer teeth by means of which it engages a gear connected to the intermediate shaft 13. Also, in this way the automatic drive of the chucking jaws 5 is assured. The driving wheel provided with outer teeth may also directly engage the pinion 11 of the drive shaft 10. Similarly, a change speed gear can be interposed in the driving connection between the drive shaft 10 and the chucking jaws 5. In all instances, an automatic drive of the chucking jaws 5 is effected from the drive motor 9.

It is, of course, to be understood that the present invention is, by no means, limited to the specific showing in the drawings, but also comprises any modifications within the scope of the appended claims.

What is claimed is:

1. A chuck especially for use in connection with a device for carrying out machining operations on surfacing of workpieces including pipes, which comprises in combination: chucking jaws pivotally journalled to move accurately and uniformly against the workpiece surfacing, driving motor means, and power transmission means in the manner of a planetary gear transmission having drive parts positively connecting said driving motor means directly with said chucking jaws, said power transmission means being exclusively for rotation of said pivotally journalled chucking jaws, rotatable shaft means connected to said motor means by said power transmission means and comprising a plurality of chucking jaw shafts each having a gear fixedly connected thereto, and gear means drivingly connecting said gears on said chucking jaw shafts with said motor means, said gears fixedly connected to said chucking jaw shafts being arranged on the latter at about the central portion of the length thereof, and each end of said jaw shafts having a chucking jaw connected thereto.

2. A chuck in combination according to claim 1, which includes: rotatable supporting means, and rotatable shaft means rotatably journalled in said rotatable supporting means and having said chucking jaws fixedly connected to said shaft means for rotation therewith, said power transmission means interconnecting said shaft means and said motor means.

3. A chuck in combination according to claim 2, in which said rotatable shaft means are synchronously driven.

4. A chuck especially for use in connection with a device for carrying out machining operations on surfacing of workpieces including pipes, which comprises in combination: chucking jaws pivotally journalled to move accurately and uniformly against the workpiece surfacing, driving motor means, and power transmission means in the manner of a planetary gear transmission having drive parts positively connecting said driving motor means directly with said chucking jaws, said power transmission means being exclusively for rotation of said pivotally journalled chucking jaws, rotatable shaft means connected to said motor means by said power transmission means and comprising a plurality of chucking jaw shafts each having a gear fixedly connected thereto, and gear means drivingly connecting said gears on said chucking jaw shafts with said motor means, said rotatable supporting means being provided with recess means, and said gears fixedly connected to said chucking jaw shafts being respectively located in said recess means and by opposite walls defining said recess means being secured against axial displacement.

5. A chuck in combination according to claim 4, in which said gear means include a first sprocket wheel and a chain drive drivingly connecting said first sprocket wheel to said motor means.

6. A chuck in combination according to claim 5, which includes: an intermediate shaft, a second sprocket wheel connected to said intermediate shaft and drivingly connected to said first sprocket wheel, and gear transmission means drivingly connecting said intermediate shaft to said motor means.

* * * * *